(No Model.)
E. SMALL.
APPARATUS FOR MAKING WIRE SOLDER.
No. 262,625. Patented Aug. 15, 1882.
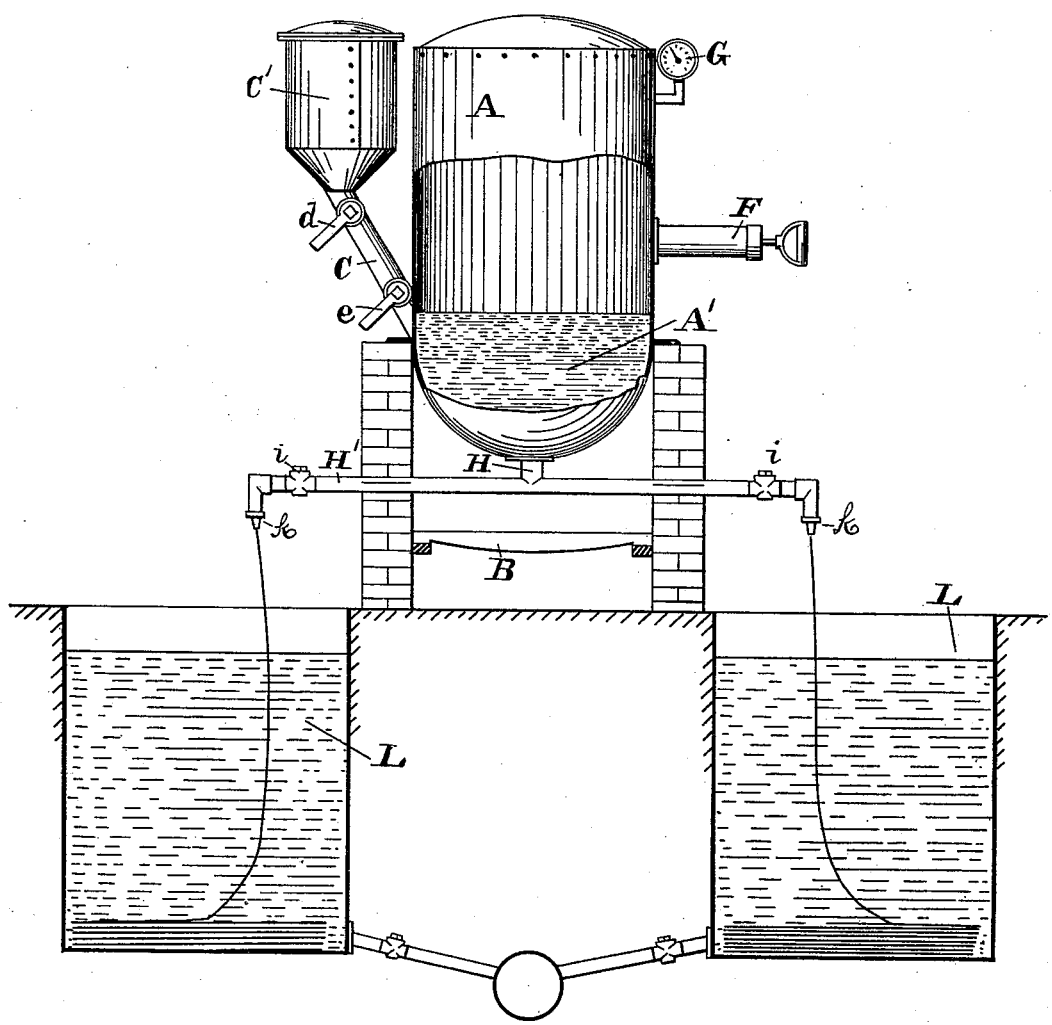
Witnesses:
A. E. Eader
John E. Morris.
Inventor:
Edward Small
By his Atty
Chas. B. Mann

United States Patent Office.

EDWARD SMALL, OF BALTIMORE, MARYLAND.

APPARATUS FOR MAKING WIRE-SOLDER.

SPECIFICATION forming part of Letters Patent No. 262,625, dated August 15, 1882.

Application filed May 23, 1882. (No model.)

*To all whom it may concern:*

Be it known that I, EDWARD SMALL, a citizen of the United States, residing at Baltimore, in the State of Maryland, have invented certain new and useful Improvements in Apparatus for Making Wire-Solder, of which the following is a specification, reference being had therein to the accompanying drawing.

My invention relates to an apparatus and process for the manufacture of wire-solder.

The drawing hereto annexed illustrates the apparatus in vertical section.

The letter A designates a retort or chamber, the lower end, A', of which constitutes the solder-melting receptacle. B is a furnace, of any suitable kind, to heat the solder-receptacle. The walls of the retort extend up some distance above the solder-melting receptacle, and are surmounted by a tight-fitting cap strongly secured to the walls. All the upper part of the retort constitutes an air-tight chamber.

A feeder to the solder-receptacle consists of a tube, C, one end of which enters the wall, the said tube having a downward-inclining position, whereby lumps or bars of solder entering the outer and highest end of the tube will, by the action of gravity, slide into the solder-receptacle. This tube is provided with two valves, one of which, the valve *d*, is near the highest end, and the other, the valve *e*, is near the lowest end. Both valves may fit practically air-tight. If constructed as just described, the solder may be placed in the highest end of the tube by an attendant.

A hopper, C', is, however, shown in the drawing, and its lower end is in connection with the highest end of the feeder-tube. The object of this hopper will presently be shown. The general shape of the hopper is that of a funnel. Its upper end is provided with a tight-fitting cover, by removing which a quantity of solder in the form of cut bits is supplied to the hopper. The cut bits of solder contained in the hopper will, by gravity, be delivered into the high end of the feeder-tube. The first valve, *d*, may then be opened to allow the solder to enter the tube, and said valve is then closed and the second valve, *e*, opened to deliver the solder into the receptacle.

An air-forcing device, in the present instance a pump, F, is in connection with the retort and solder-receptacle, and is used to compress atmospheric air, or, if desired, any gas devoid of oxygen, into the retort. By means of this pump any desired pressure of air or gas may be created in the retort, a gage, G, being attached to the retort to indicate the pressure.

The bottom of the solder-receptacle is tapped by a draw-off pipe, H, from which one or more pipes, H', may branch. Each pipe is provided with a cock, *i*, and a detachable teat or nozzle, *k*, from which the molten solder issues.

An apparatus or device for chilling or cooling the solder consists in the present instance of a tank, L, placed under each draw-off nozzle, and said tank should contain water. A tank containing water is, however, not essential, as a grooved steel plate placed on an incline, with provision for keeping the plate cool, will serve as a chiller.

The operation of the apparatus may be described as follows: Some solder having been placed in the receptacle A', and the heat from the furnace B having brought the solder to a molten condition, air or gas is compressed by the pump to the desired extent into the retort, and upon the surface of the solder the cock *i* is opened to allow the expulsion of a stream of molten solder, which will issue in constant and uniform quantity, and at the same time the supply of cold solder is fed into the receptacle, this latter operation not interfering with the compression of the air or the expulsion of the molten solder. As these operations go on simultaneously, the stream of molten solder may continue to issue for an indefinite period. The stream of molten solder is discharged into the chiller, and is thereby cooled, and, where the chiller consists of a tank containing water, will coil itself up in the bottom of the tank.

I am aware that an apparatus has been used for making wire-solder wherein the molten solder flows in a stream into a tank containing water, and I make no claim to such device, nor is such essential to the production of wire-solder by my apparatus.

By the method herein described, a wire-solder is produced perfectly uniform in size, a true round in cross-section, and having a smooth surface throughout its length—characteristics which are most desirable for a wire-solder to possess which is designed for use in that class of soldering-machines which employ wire-solder.

The two valves $d$ and $e$ are used in the feeder to prevent the escape of compressed air or gas when feeding solder. The valve $d$ is first opened, and the inclined tube is filled with lumps or bars of solder, which slide down the tube against the valve $e$. The first valve, $d$, is then closed, and the second valve, $e$, is opened, whereupon the solder in the tube slides into the receptacle A'.

As the nozzles are detachable, any size may be used, and finer wire can be made by this apparatus and process than by any other heretofore employed.

The apparatus may be varied in its construction and in the arrangement of parts from that here shown without departing from the principle of my invention.

Having described my invention, I claim and desire to secure by Letters Patent of the United States—

1. The combination of a close receptacle in which to melt solder, a device to force air into the close receptacle, and a feeder provided with two valves, as set forth.

2. The combination of a close solder-melting receptacle provided with a draw-off nozzle, a device to force air or gas into the close receptacle, and a chiller, as set forth.

3. The process of manufacturing wire-solder which consists in feeding the cold solder into a close melting-receptacle, forcing air or gas into the close receptacle, and expelling a continuous stream of molten solder from the receptacle simultaneously, as hereinbefore set forth.

In testimony whereof I affix my signature in presence of two witnesses.

EDWARD SMALL.

Witnesses:
  JNO. T. MADDOX,
  JOHN E. MORRIS.